(12) United States Patent
Beaurepaire (10) Patent No.: US 12,055,398 B2
(45) Date of Patent: Aug. 6, 2024

(54) METHOD AND APPARATUS FOR PREDICTING CARJACKINGS

(71) Applicant: HERE GLOBAL B.V., Eindhoven (NL)

(72) Inventor: Jerome Beaurepaire, Nantes (FR)

(73) Assignee: HERE GLOBAL B.V., Eindhoven (NL)

( * ) Notice: Subject to any disclaimer, the term of this patent is extended or adjusted under 35 U.S.C. 154(b) by 208 days.

(21) Appl. No.: 17/836,784

(22) Filed: Jun. 9, 2022

(65) Prior Publication Data

US 2023/0400314 A1    Dec. 14, 2023

(51) Int. Cl.
G01C 21/34    (2006.01)
G01C 21/00    (2006.01)
G06V 20/52    (2022.01)
G06V 20/56    (2022.01)

(52) U.S. Cl.
CPC ..... *G01C 21/3461* (2013.01); *G01C 21/3415* (2013.01); *G01C 21/38* (2020.08); *G06V 20/52* (2022.01); *G06V 20/588* (2022.01)

(58) Field of Classification Search
CPC ........... G01C 21/3415; G01C 21/3461; G01C 21/38; G06V 20/588
See application file for complete search history.

(56) References Cited

U.S. PATENT DOCUMENTS

| | | | |
|---|---|---|---|
| 11,002,555 B2 | 5/2021 | Siskind et al. | |
| 11,007,979 B1 | 5/2021 | Mitchell et al. | |
| 2009/0140887 A1 | 6/2009 | Breed et al. | |
| 2010/0094496 A1* | 4/2010 | Hershkovitz | B60L 50/66 701/22 |
| 2013/0069773 A1* | 3/2013 | Li | B60W 30/0956 340/436 |
| 2015/0142253 A1* | 5/2015 | Nolting | G07C 5/008 701/29.6 |
| 2016/0123750 A1 | 5/2016 | Healey et al. | |

FOREIGN PATENT DOCUMENTS

EP    3828777 A1    6/2021

OTHER PUBLICATIONS

Joel T. Meyer, "Machine Learning and Tracking Terrorists," Jul. 12, 2018.

\* cited by examiner

*Primary Examiner* — Seth A Silverman
(74) *Attorney, Agent, or Firm* — HERE GLOBAL B.V.

(57) ABSTRACT

A method, apparatus, and user interface for providing a carjacking detection and prediction system is disclosed. For example, image data of at least one vehicle may be obtained and a carjacking indicator for the vehicle based on the obtained image data is determined. One or more road segments may then be identified, and the determined indicator is associated with the one or more identified road segments to update a map layer of a geographic database and/or perform other actions.

11 Claims, 6 Drawing Sheets

METHOD AND APPARATUS FOR PREDICTING CARJACKINGS

TECHNOLOGICAL FIELD

An example embodiment relates generally to a method, apparatus, computer readable storage medium, user interface and computer program product for determining and predicting car jackings and, more particularly, for determining and predicting the risk of carjacking for vehicles based upon image data of the vehicles and their surroundings.

BACKGROUND

Modern vehicles include a plurality of different types of sensors for collecting a wide variety of information. These sensors include location sensors, such as global positioning system (GPS) sensors, configured to determine the location of the vehicle. Based upon the location of the vehicle, a variety of navigational, mapping and other services may be provided for manually driven vehicles as well as the provision of navigation and control of autonomous or semi-autonomous vehicles. Other examples of sensors include cameras or other imaging sensors that capture images of the environment including objects in the vicinity of the vehicle. The images that are captured may be utilized to determine the location of the vehicle with more precision. A more precise determination of the vehicle location may be useful in conjunction with the provision of navigational, mapping and other informational services for a manually driven vehicle. Additionally, the more precise determination of the vehicle location may provide for the improved navigation and control of an autonomous or semi-autonomous vehicle by taking into account the location of other objects, such as other vehicles, in proximity to the vehicle carrying the sensors.

The sensors on board vehicles therefore collect a wide variety of data that may be utilized for various purposes. However, these sensors currently on-board vehicles do have limitations and do not provide all of the different types of information that would be useful in various applications. One specific example of a current limitation is in the generation of route guidance and automated vehicle controls in certain scenarios.

BRIEF SUMMARY

A method for providing a carjacking prediction system comprising obtaining image data of at least one vehicle and vehicle surroundings; determining a carjacking indicator based on the obtained image data; identifying one or more road segments; and associating the determined carjacking indicator with the one or more identified road segments to update a map layer of a geographic database. The method above may further comprise receiving an indication of a location of the vehicle and identifying one or more points of interest proximate the location of the vehicle. All the image data may be obtained from vehicle camera systems, traffic cameras, etc.

This method may also further comprise determining a level of risk associated with the determined carjacking indicator and one or more points of interest and updating a map layer with the level of risk. This method may also further comprise identifying at least one additional carjacking indicator, point of interest, map object, etc. based on road segments similarly situated to previously identified road segments and carjacking indicators, points of interest, map objects, etc. This method may also further comprise providing an alert and/or route guidance in response to the determined indicator to at least one end user device.

Another embodiment may be described as an apparatus configured to predict a carjacking, the apparatus comprising at least one processor and at least one memory storing computer program code, the at least one memory and the computer program code configured to, with the processor, cause the apparatus to at least obtain image data of at least one vehicle and vehicle surroundings; determine a carjacking indicator based on the obtained image data; identify one or more road segments; and associate the determined carjacking indicator with the one or more identified road segments to update a map layer of a geographic database. This apparatus may also be configured to, with the processor, receive an indication of a location of the vehicle, and wherein the at least one memory and the computer program code are configured to, with the processor, cause the apparatus to identify one or more points of interest proximate the location of the vehicle.

This embodiment and others may further comprise determining a level of risk associated with the determined indicator and one or more points of interest and updating a map layer with the level of risk. This embodiment may also include the at least one memory and the computer program code being further configured to, with the processor, cause the apparatus to receive an indication of a location of the vehicle, and wherein the at least one memory and the computer program code are configured to, with the processor, cause the apparatus to identify one or more map objects proximate the location of the vehicle. This embodiment and others may also cause the apparatus to obtain the image data via a vehicle camera system and generates alerts and/or route guidance. The apparatus may yet also comprise identifying at least one additional carjacking indicator, point of interest, etc. based on road segments similarly situated to previously identified road segments and carjacking indicators, points of interest, etc.

Another embodiment may be described as a user interface for providing a user with a route to a destination, comprising the steps of receiving input upon a user device that indicates a destination; accessing a geographic database to obtain data that represent roads in a region in which the user device operates; determining a route to the destination by selecting road segments to form a continuous path to the destination; and displaying the determined route or portion thereof to the user, wherein the determined route avoids at least one road segment in response to a determined carjacking indicator for at least one vehicle. The route determined for the vehicle may avoid one or more carjacking indicators, points of interest, etc. proximate the location of the vehicle. Additionally, the determined carjacking indicator may be derived at least in part on image data obtained via a vehicle camera system. The user interface described herein may also provide alerts and/or additional route guidance in relation to the determined carjacking indicator and provide this information on end user devices (e.g., smartphones, tablets, etc.) and/or upon motor vehicle built-in displays.

Also, a computer program product may be provided. For example, a computer program product comprising instructions which, when the program is executed by a computer, cause the computer to carry out the steps described herein.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A system, method, apparatus, user interface, and computer program product are provided in accordance with an example embodiment to determine potential vehicle carjackings based on image data of the vehicle. In order to determine the carjacking risk, the system, method, apparatus, non-transitory computer-readable storage medium, and computer program product of an example embodiment are configured to obtain image data of at least one vehicle and determine a carjacking indicator for the vehicle based on the obtained image data. The image data may be obtained from a vehicle camera system, traffic cameras, etc. The system in this embodiment may then identify one or more road segments and associate the determined indicator with one or more related road segments to update a map layer of a geographic database.

The system, apparatus, method, etc. described above may be any of a wide variety of computing devices and may be embodied by either the same or different computing devices. The system, apparatus, etc. may be embodied by a server, a computer workstation, a distributed network of computing devices, a personal computer or any other type of computing device. The system, apparatus, etc. configured to predict carjackings may similarly be embodied by the same or different server, computer workstation, distributed network of computing devices, personal computer or other type of computing device.

Alternatively, the system, etc. may be embodied by a computing device on board a vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

Figure 1:
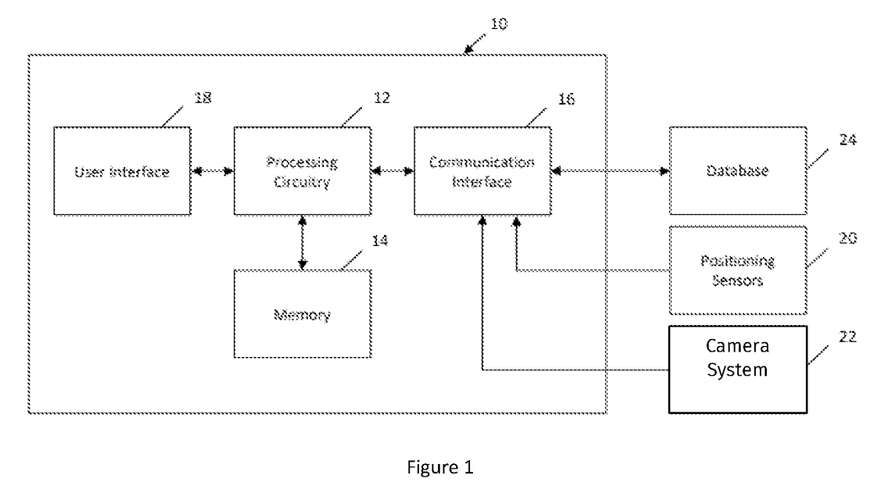
FIG. 1 is a block diagram of an apparatus that may be specifically configured in accordance with an example embodiment.

Regardless of the manner in which the system, apparatus, etc. is embodied, however, an apparatus 10 includes, is associated with, or is in communication with processing circuitry 12, memory 14, a communication interface 16 and optionally a user interface 18 as shown in FIG. 1. In some embodiments, the processing circuitry (and/or co-processors or any other processors assisting or otherwise associated with the processing circuitry) can be in communication with the memory via a bus for passing information among components of the apparatus. The memory can be non-transitory and can include, for example, one or more volatile and/or non-volatile memories. In other words, for example, the memory may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory can be configured to buffer input data for processing by the processing circuitry. Additionally, or alternatively, the memory can be configured to store instructions for execution by the processing circuitry.

The processing circuitry 12 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally, or alternatively, the processing circuitry can include one or more processors configured in tandem via the bus to enable independent execution of instructions, pipelining and/or multithreading.

In an example embodiment, the processing circuitry 12 can be configured to execute instructions stored in the memory 14 or otherwise accessible to the processing circuitry. Alternatively, or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 10 of an example embodiment can also include the communication interface 16 that can be any means such as a device or circuitry embodied in either hardware or a combination of hardware and software that is configured to receive and/or transmit data from/to other electronic devices in communication with the apparatus, such as a database 24 which, in one embodiment, comprises a map database that stores data (e.g., one or more map objects, POI data, etc.) generated and/or employed by the processing circuitry 12. Additionally, or alternatively, the communication interface can be configured to communicate in accordance with various wireless protocols including Global System for Mobile Communications (GSM), such as but not limited to Long Term Evolution (LTE), 3G, 4G, 5G, 6G, etc. In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally, or alternatively, the communication interface can include the circuitry for interacting with the antenna(s) to cause transmission of signals via the antenna(s) or to handle receipt of signals received via the antenna(s). In some environments, the communication interface can alternatively or also support wired communication and/or may alternatively support vehicle to vehicle or vehicle to infrastructure wireless links.

In certain embodiments, the apparatus 10 can be equipped or associated with one or more positioning sensors 20, such as one or more GPS sensors, one or more accelerometer sensors, one or more light detection and ranging (LiDAR) sensors, one or more radar sensors, one or more gyroscope sensors, and/or one or more other sensors. Any of the one or more sensors may be used to sense information regarding movement, positioning and location, and/or orientation of the apparatus for use, such as by the processing circuitry 12, in navigation assistance and/or autonomous vehicle control, as described herein according to example embodiments.

In certain embodiments, the apparatus 10 may further be equipped with or in communication with one or more camera systems 22. In some example embodiments, the one or more camera systems 22 can be implemented in a vehicle or other remote apparatuses.

For example, the one or more camera systems 22 can be located upon a vehicle or proximate to it (e.g., traffic cameras, security cameras, etc.). While embodiments may be implemented with a single camera such as a front facing camera in a consumer vehicle, other embodiments may include the use of multiple individual cameras at the same time. A helpful example is that of a consumer sedan driving down a road. Many modern cars have one or more cameras installed upon them to enable automatic braking and other types of assisted or automated driving. Many cars also have rear facing cameras to assist with automated or manual parking. In one embodiment of the current system, apparatus, method, etc. these cameras are utilized to capture images of other vehicles as the sedan travels around. The system takes these captured images (via the camera systems 22) and analyzes them to determine the types of vehicles present. Certain types of vehicles may be detected via any functional means including but not limited to the relative size of vehicles present in each location, movement patterns, etc.

The data captured concerning the vehicles present may also come from traffic cameras, security cameras, or any other functionally useful source (e.g., historic data, satellite images, delivery and pickup schedules, bus schedules, etc.).

The analysis of the image data of the vehicle may be carried out by a machine learning model. This model may utilize any functionally useful means of analysis to identify vehicles on a given roadway, road segment, or general area. The system, in this embodiment, may also examine relevant proximate points of interest (POIs), map objects, road geometries, animate objects, etc. which could impact the behavior of the identified vehicles.

The locations of the vehicles, any animate objects, any relevant points of interest (POIs), and other types of data which are utilized by various embodiments of the apparatus may each be identified in latitude and longitude based on a location of the vehicle using a sensor, such as a GPS sensor to identify the location of the vehicle. The POIs identified by the system may also be detected via the camera systems 22. For example, a larger human (e.g., an adult) may be walking by a gas station and in some embodiments of the present innovation the system, apparatus, etc. may examine the image data to identify the gas station as a likely relevant point of interest. Another example is that of a crowd of humans (e.g., a protest) blocking a street in front of an embassy. As a car utilizing the apparatus approaches the crowd the apparatus can detect the protest or other civil unrest (i.e., many animate objects) and act upon this.

In certain embodiments, information detected by the one or more cameras can be transmitted to the apparatus 10, such as the processing circuitry 12, as image data. The data transmitted by the one or more cameras can be transmitted via one or more wired communications and/or one or more wireless communications (e.g., near field communication, or the like). In some environments, the communication interface 16 can support wired communication and/or wireless communication with the one or more camera sensors.

The apparatus 10 may also optionally include a user interface 18 that may, in turn, be in communication with the processing circuitry 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory 14, and/or the like).

Figure 2:
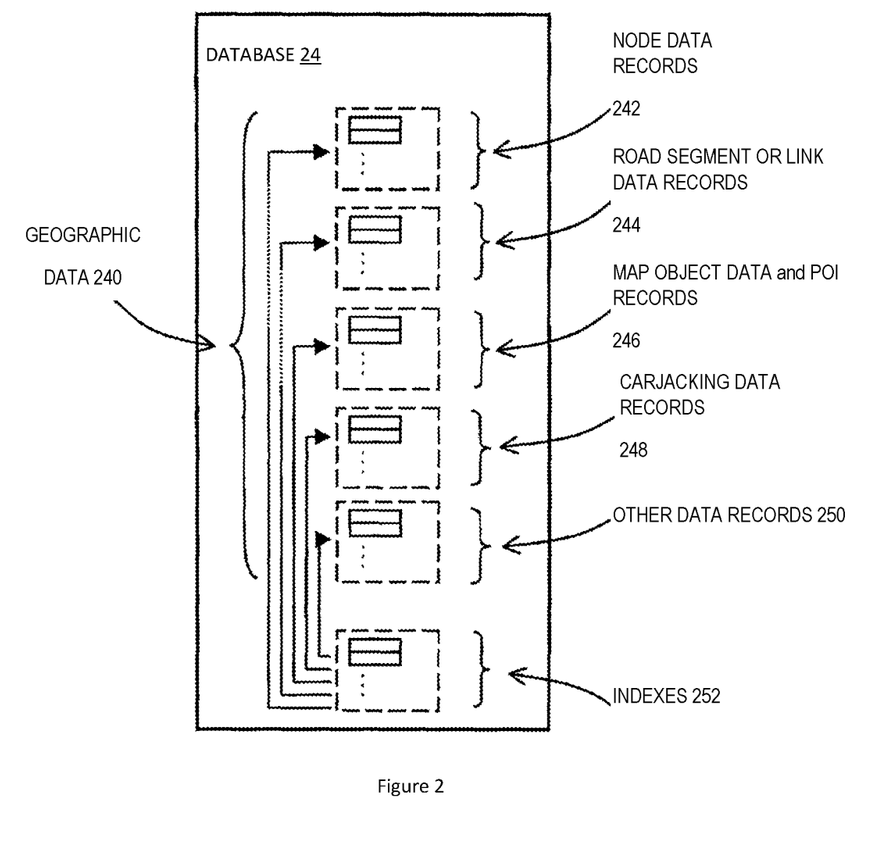
FIG. 2 is a block diagram of a geographic database of an example embodiment of the apparatus.

Turning to FIG. 2, the map or geographic database 24 may include various types of geographic data 240. This data may include but is not limited to node data 242, road segment or link data 244, map object and point of interest (POI) data 246, carjacking data records 248, or the like (e.g., other data records 250 such as traffic data, sidewalk data, etc.). Other data records may include computer code instructions and/or algorithms for executing a machine learning model that is capable of providing a prediction of carjacking indicators. The other records may further include verification data indicating: (1) whether a verification of a prediction for an adverse indicator (e.g., carjackings) was conducted; (2) whether the verification validates the prediction; or (3) a combination thereof.

In one embodiment, the following terminology applies to the representation of geographic features in the database 24. A "Node"—is a point that terminates a link, a "road/line segment"—is a straight line connecting two points, and a "Link" (or "edge") is a contiguous, non-branching string of one or more road segments terminating in a node at each end. In one embodiment, the database 24 follows certain conventions. For example, links do not cross themselves and do not cross each other except at a node. Also, there are no duplicated shape points, nodes, or links. Two links that connect each other have a common node.

The map database 24 may also include cartographic data, routing data, and/or maneuvering data as well as indexes 252. According to some example embodiments, the road segment data records may be links or segments representing roads, streets, or paths, as may be used in calculating a route or recorded route information for determination of one or more personalized routes. The node data may be end points (e.g., intersections) corresponding to the respective links or segments of road segment data. The road link data and the node data may represent a road network, such as used by vehicles, cars, trucks, buses, motorcycles, bikes, scooters, and/or other entities.

Optionally, the map database may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 24 may be maintained by a content provider e.g., the map data service provider and may be accessed, for example, by the content or service provider processing server. By way of example, the map data service provider can collect geographic data and dynamic data to generate and enhance the map database and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The map database 24 may be a master map database, such as an HD map database, stored in a format that facilitates updates, maintenance, and development. For example, the master map database or data in the master map database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map database 24 may be a master geographic database, but in alternate embodiments, a client-side map database may represent a compiled navigation database that may be used in or with end user devices to provide navigation and/or map-related functions. For example, the map database may be used with the mobile device to provide an end user with navigation features. In such a case, the map database can be downloaded or stored on the end user device which can access the map database through a wireless or wired connection, such as via a processing server and/or a network, for example.

The data records for carjacking data 248 may include various points of data such as, but not limited to: time, date, movement patterns of the assailants, if the assailants were armed, type of weapon or armament, any sensor data acquired from one or more sensors of a vehicle (e.g., audio, video, etc.); travel data of a vehicle (pre- and post-theft), GPS coordinates for a given detected carjacking, etc.

Figure 3A:
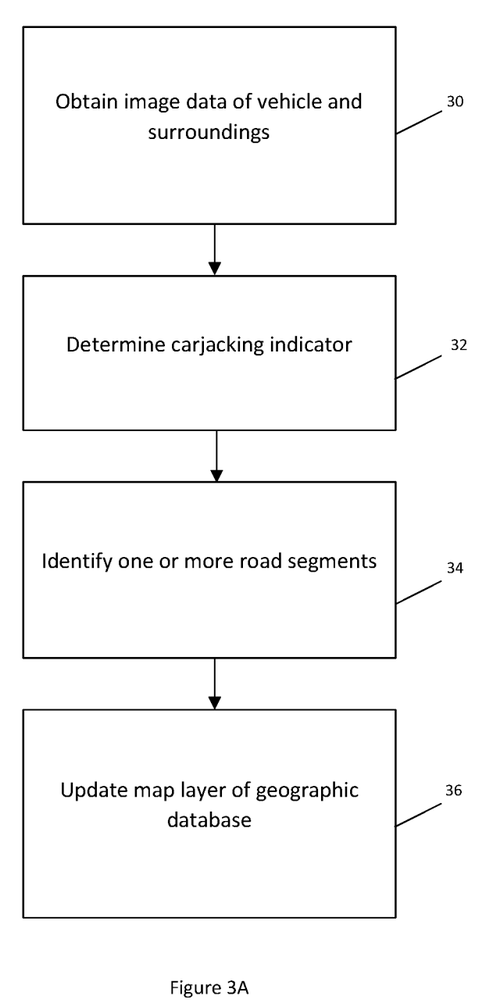
FIG. 3A is a flowchart illustrating the operations performed, such as by the apparatus of FIG. 1, in order for an apparatus to identify a determined carjacking indicator for a vehicle.

FIG. 3A is a flowchart which demonstrates how the apparatus 10 identifies carjacking indicators for vehicles. More, fewer, or different acts or steps may be provided. At a first step (block 30) the apparatus may obtain one or more images of at least one vehicle. The images may be obtained from the camera of an end user device such as a smart phone, the camera system of a vehicle, or even traffic cameras, etc. The apparatus may be trained to analyze the image data (see FIG. 3C) via machine learning model or any other functionally capable means to identify vehicles. The vehicles may include but are not limited to: cars, trucks, SUVs, motorbikes, scooters, semitrucks, service vehicles, military vehicles or equipment, heavy industrial vehicles or equipment, road construction vehicles or equipment, etc.

The apparatus 10 may also identify animate objects such as humans, robots, pets, other animals, etc. and relevant POIs. Once these images are obtained, the apparatus may then determine at least one carjacking indicator at another step (block 32). The carjacking indicator may be any indication of a carjacking for a given vehicle. A carjacking is traditionally defined as the taking of a motor vehicle by force. It should be noted the apparatus may determine actual physical, real-time indicators of carjackings for vehicles (e.g., image data of a person approaching a car, the slowing car, driver exiting the car, car leaving at a high rate of speed, etc. as captured by the apparatus) and may also determine non-physical and/or non-real-time indicators.

For example, some movement patterns indicate a likelihood a future carjacking might occur. An example of this is a car being driven down a roadway by someone from out of town looking for a popular restaurant. They may drive slowly with hopes of not passing their destination by accident and such driving can make them a target for carjacking. Based on the driving pattern, license plate, etc. the apparatus may detect the cautious driving and that the car is not local and thus predict a heightened chance of carjacking for the given vehicle. In this way the apparatus need not rely on actual real-time image data of a car being stolen to detect potential carjacking indicators.

Once a carjacking indicator is determined for a given vehicle, the apparatus may then identify one or more road segments (block 34) upon which the vehicle(s) are present. The identification of the relevant road segments may be done via a vehicle's onboard GPS (see FIG. 1) or any other functional means. Once identified, the apparatus may then update a map layer of a geographic database (block 36). The updating of the map layer may include but is not limited to identifying/associating locations of the identified relationships with certain road segments and then providing some type of data indicator or flag to mark that road segment or attribute (metadata) that can be used as an identifier when needed to access or retrieve the road segments for various navigation functions. This data can also be used to generate alerts and analyze other similarly situated road segments for the potential carjacking risk. The road segment data may also include sidewalk data or areas included in/associated with the road segment records or the road segment records may represent path records such as sidewalks, hiking trails, etc.

Figure 3B:
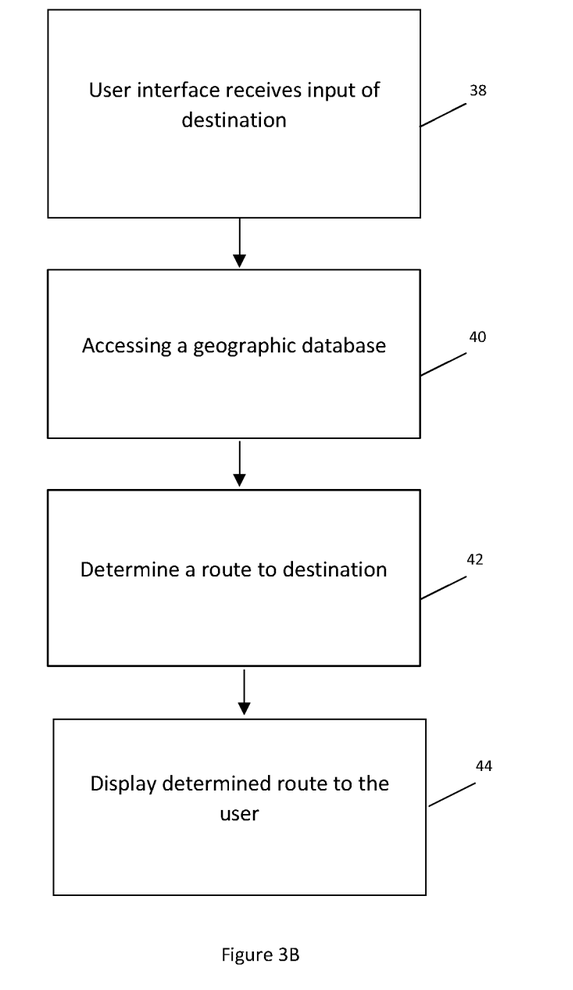
FIG. 3B is a flowchart illustrating the operations performed, such as by the apparatus of FIG. 1, in order to provide a graphical user interface and/or functions thereof.

Turning to FIG. 3B, the apparatus 10 may support a user interface 18 (as shown in FIG. 1). More, fewer, or different acts or steps may be provided. At a first step, the user interface may receive an input of destination from an end user (block 38). This input of destination may be received via an end user device graphical user interface (GUI) running upon a smartphone, tablet, integrated vehicle navigation system, etc. Once a destination is input, the apparatus may then access a geographic database (block 40) and determine a route to the input destination (block 42). The determined route may, in some embodiments, avoid at least one road segment in response to a determined carjacking indicator for at least one vehicle. As mentioned above, the determination of carjacking indicator may be based on any functionally capable means including identification of an actual physical driving changes (e.g., sudden braking, change of direction, etc.) and/or prediction based on movement pattern analysis of a pedestrian approaching a roadway, etc.

Notwithstanding how the apparatus generates a determination of a carjacking indicator, this information may then be used to route the end user towards or away from certain road segments when generating a route. The route determined by the apparatus 10 may then be displayed to then end user (block 44) via the same or a different user interface. The apparatus can take any number of additional actions (or in place of) what is called for in block 44. For example, the apparatus may provide audio guidance instead of a visual display. The navigation instructions may also be provided to an autonomous vehicle for routing (for example, without any display to the user). It should also be noted the UI can be run by a processor and stored upon one or more types of memory in some embodiments.

Figure 3C:
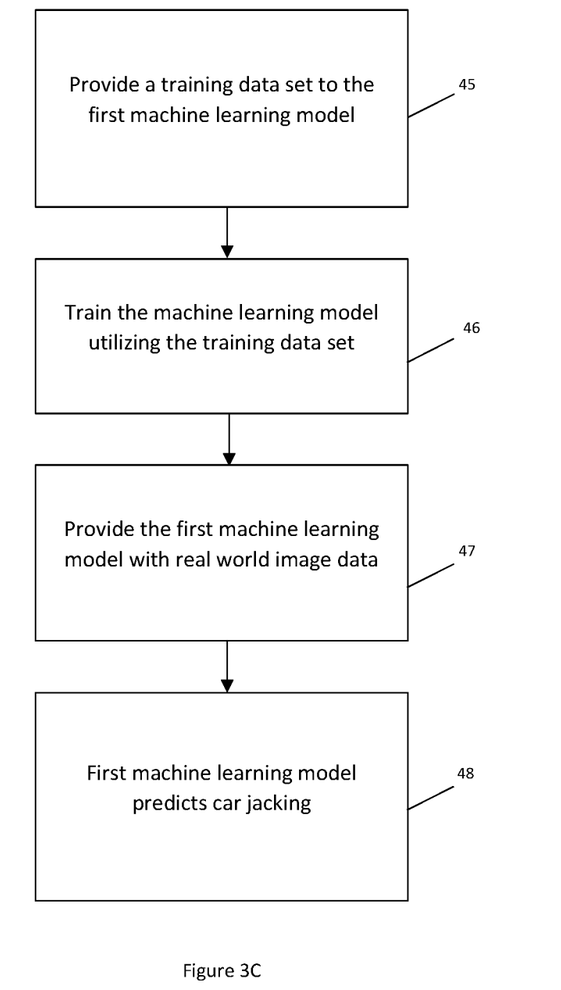
FIG. 3C is a flowchart illustrating the operations performed, such as by the apparatus of FIG. 1, in order to train machine learning models to predict carjackings for vehicles.

Referring now to FIG. 3C, the operations performed, such as by the apparatus 10 of FIG. 1, in order to train a machine learning model to detect carjacking indicators for a vehicle. More, fewer, or different acts or steps may be provided. As shown in block 45, the apparatus includes means, such as the processing circuitry 12, memory 14, the communication interface 16 or the like, for providing a training data set that includes a plurality of training examples. In this regard, the training data set may be provided by access by the processing circuitry of the training data set stored by the memory. Alternatively, the training data set may be provided by access by the processing circuitry to a database 24 or other memory device that either may be a component of the apparatus or may be separate from, but accessible to the apparatus, such as the processing circuitry, via the communication interface. It should be noted the system apparatus may utilize more than one machine learning model to carry out the steps described herein.

In accordance with an example embodiment, the apparatus 10 also includes means, such as the processing circuitry 12, the memory 14 or the like, configured to train a machine learning model utilizing the training data set (block 46). The machine learning model, as trained, is configured to detect and predict carjackings. The prediction may be based at least in part upon image data of the vehicles.

The apparatus 10, such as the processing circuitry 12, may train any of a variety of machine learning models to identify vehicles based upon a single or plurality of images. Examples of machine learning models that may be trained include a decision tree model, a random forest model, a neural network, a model that employs logistic regression or the like. In some example embodiments, the apparatus, such as the processing circuitry, is configured to separately train a plurality of different types of machine learning models utilizing the same training data including the same plurality of training examples. After having been trained, the apparatus, such as the processing circuitry, is configured to determine which of the plurality of machine learning models predicts vehicles based upon image data with the greatest accuracy. The machine learning model that has been identified as most accurate is thereafter utilized.

In one example, the machine learning model may be a deep learning neural network computer vision model that utilizes image data of vehicles to automatically identify them. A training example for this first machine learning model may include image data of known classes or types of vehicles. Known vehicles could include but are not limited to horse-drawn wagons or carriages, bicycles, motor vehicles (motorcycles, cars, trucks, buses), railed vehicles (trains, trams), watercraft (ships, boats, underwater vehicles), amphibious vehicles (screw-propelled vehicles, hovercraft), aircraft (airplanes, helicopters, aerostats) and spacecraft. Various images of different types of vehicles are provided to the machine learning model to train and improve its accuracy.

In some example embodiments, a balance or trade-off between the accuracy with which the vehicles are identified and the efficiency with which the machine learning model identifies the objects is considered. For example, a first set of images may produce the most accurate identification, but a second combination of images may produce an identification of objects that is only slightly less accurate, but that is significantly more efficient in terms of its prediction. Thus, the second combination of images that provide for sufficient, even though not the greatest, accuracy, but does so in a very efficient manner may be identified by the apparatus 10, such as the processing circuitry 12, as the preferred images to be provided to the machine learning model in order to identify vehicles in subsequent instances.

In some embodiments, a training example also includes information regarding a map object, such as a map object that is located at the location at which the image data was captured. One example of a map object is a bridge, and another example of a map object is a railroad crossing. A wide variety of other map objects may exist including, for example, manhole covers, transitions between different types of road surfaces, medians, parking meters, various forms of infrastructure, or the like. As described in more detail below, the map object that is included in a training example may be determined or provided in various manners. For example, the map object may be defined, either manually or automatically, by reference to a map database 24 and identification of a map object at the same location or at a location proximate, such as within a predefined distance of, the location at which the corresponding image data was captured. The training example may also include point of interest (POI) data. A POI may be something like a restaurant, park, school, bus stop, etc. Relevant POIs may also be defined, either manually or automatically, by reference to a map database 24 and identification of a POI at the same location or at a location proximate, such as within a predefined distance of, the location at which the corresponding image data was captured. The location of relevant POIs and/or map objects may be found by GPS coordinates or any other functionally capable means.

Various other types of data may also be utilized to train the machine learning model. Such additional data may include but is not limited to data concerning typical movement of animate objects as observed during or in relation to carjackings. For example, typically a driver is forced to exit their stopped vehicle by another human (i.e., animate object) during a carjacking. The manner by which the criminal approaches and conducts the carjacking of the victim's vehicle may be observed (e.g., does the carjacker sneak up in the car's blind spot, do they hide in an alley beforehand, do they work with others, etc.) by the apparatus via image data of carjackings to determine if there are any commonalities between the movement patterns of various carjackers. Other various types of data may also be utilized when training the machine learning model including map geometry data, historic data, etc. Ground truth data may also be utilized with a combination of these different features for supervised machine learning.

Once trained, the machine learning model may then be provided various real-world data as mentioned in block 47 and used to predict carjacking indicators for vehicles based on these various data points and others (block 48).

A non-limiting example of the apparatus 10 detecting and predicting a carjacking is that of a passenger car driving down a roadway at night. As the car drives down the road, it approaches a stop light adjacent to an alley with a dumpster in it. The dumpster may provide cover for an assailant to hide and its proximity to the roadway heightens this risk. The apparatus 10 will capture images of the stoplight, alley, and dumpster via the car's camera system 22. The image data captured is provided to the machine learning model which, when trained, may identify the stoplight and alley as well as the relevant objects in proximity to the roadway (e.g., map objects, POIs, etc.).

One such object, in this example, could be the dumpster located in the alley proximate to the roadway. The type of object determination and the relevant other information (e.g., POIs, etc.) identified may be provided to the machine learning model. The machine learning model will then be able to predict if are any carjacking indicators based on the presence of these object(s) and their proximity to the road. In this example, since the vehicle is headed towards the stoplight adjacent to an alley with a dumpster, and it is night (confirmed time/date data) the apparatus 10 may predict that vehicle is at risk of being carjacked as someone could hide in the alley and surprise them when they stop at the stoplight.

The machine learning model in this example makes its determination based on a combination of specific factors (map data, image data, etc.), and the model predicts the presence of a potential carjacking for the vehicle because of specific factors in a specific combination or configuration are present. The factors in this example may include the image data of the vehicle, image data of the roadways, image data of objects proximate to the roadway (e.g., dumpsters, trash cans, etc.) as well as time of day data, historic data, etc. This set of data, provided to the model, matches (or is like) the factors used in the training process (in this example). This allows the machine learning model to predict a carjacking given the location, time of day, vehicles, and animate objects present, etc.

The machine learning model may also raise and lower its risk assessment based on image data etc. For example, if there were people in the alley in the example above, the machine learning model might find there was a carjacking indicator present for the combination of factors (e.g., nighttime, people present in the alley, hiding spots, etc.) while in the same situation if no one was present in the alley the model might arrive at the conclusion that it is safe to approach the area.

The determination of a carjacking indicator for the vehicle can then be utilized in various ways. The apparatus 10 may alert the driver of the vehicle (and others) via graphical user interface that there could be a risk ahead. The apparatus may also update one or more map layers and/or databases to account for this risk. In some embodiments, the predicted carjacking risk may be used to activate autonomous or highly assisted driving features. For example, if the sedan discussed above had self-driving capabilities the apparatus 10 could activate the self-driving mode in response to the potential danger posed by someone hiding in the alley and navigate away from the danger.

The determine carjacking indicator data may be utilized in other ways. For example, the apparatus 10 may provide to an end user updated route guidance which avoids certain areas with potential for carjackings. Continuing with the example above, the apparatus 10 may look at existing map data to determine a better route which avoids the street with troublesome alley all together.

As mentioned before, the apparatus 10 features one or more machine learning models. This model and other data may be used by the apparatus 10 to not only analyze real time driving situations as mentioned above but also examine existing map data to identify other similarly situated roadways. These similar roadways will have similar POIs, map objects, etc. So, for example, if there was another roadway with an alley and dumpster proximate to it, the apparatus 10 may be able to detect such a similar roadway and provide alerts, route guidance, etc. to an end user to avoid potential risks.

The apparatus 10 may also look at a given roadway's position relative to highways, POIs, infrastructure, etc. to determine if these factors further boost or reduce risk of carjacking for a vehicle based on historical data and/or aggregated data trends identified by the machine learning model.

Other examples of the apparatus 10 at work include crowded city settings. Cities feature by many different forms of animate objects. Humans walking their dogs, bikers, parents with strollers and kids, and many other forms of animate objects share the same sidewalks, bike lanes, and roadways. In one embodiment, the apparatus 10 may be configured to run on an end user device such as a smart phone or tablet. The apparatus 10, running on an end user device may be used by not only traditional automobile drivers but also drivers of motorcycles, mopeds, bicycles, scooters, joggers, etc. In one non-limiting example, a delivery driver on a bike may utilize the apparatus via their smart phone mounted on the bike. The smartphone's camera, traffic cameras, other vehicle's camera, etc. may be utilized by the apparatus to capture image data and monitor for different types of vehicles and animate objects proximate to them. As the end user rides around on their bike, they may encounter a popular restaurant with numerous people outside (proximate to the given roadway). It is common for carjackings to occur in populated/busy areas during the day or night. The camera system 22 may capture images of the restaurant, people, etc. The apparatus will then confirm the types of vehicles and animate objects present outside the restaurant on the sidewalk near the street via the machine learning model.

Once the animate objects have been identified, the apparatus will determine if any of them are likely to attempt a carjacking. In this example, there may be several people standing outside the restaurant waiting and the apparatus may determine the presence of the customers. Since the people standing in line for the restaurant are likely not going to commit a carjacking (stealing the end user's bike in this example), the apparatus may elect not to route away from the restaurant. The apparatus can then display route guidance or alerts to the bike rider informing them of the potential hazard and mention the risk is low, medium, high, etc.

Continuing with this example, if there is another person walking alone down the street from the restaurant the apparatus may also identify them and determine there is a higher risk of potential carjacking based on their presence close to the roadway (or sidewalk) the bike rider travels down. This risk might be utilized by the apparatus to generate an alert, route guidance, etc. If the identified lone person begins to move towards the biker rider this may boost the level of risk associated with the lone person by the apparatus (e.g., from medium to high) generating additional alerts, etc.

Figure 4:
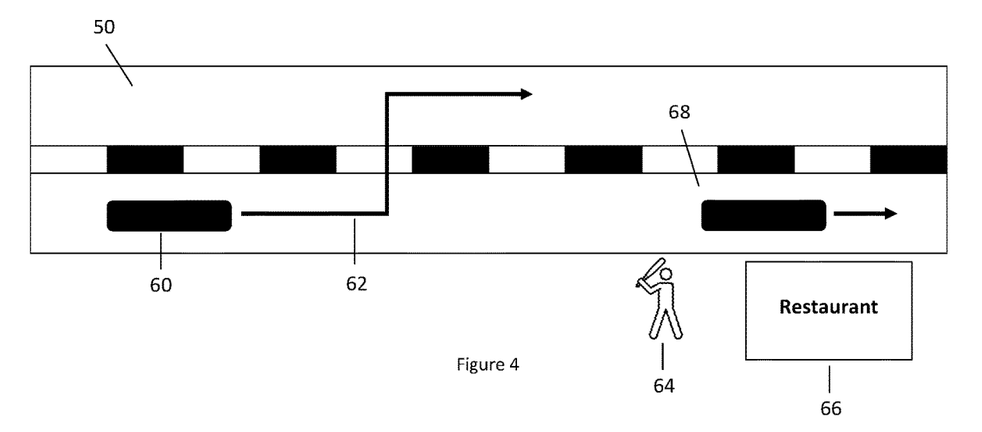
FIG. 4 is a graphical representation of a road upon which passenger cars are present with a POI proximate to the road.

Turning to FIG. 4, some of the examples discussed above are illustrated. Specifically, a sedan 60 is shown driving down a roadway 50. On the roadway 50 there is also an armed assailant 64 and a restaurant 66 ahead (proximate to the roadway) as well as another passenger car 68. As shown in FIG. 4, the sedan 60 is utilizing the apparatus 10 to predict if the armed assailant 64 is going to attempt a carjacking. The apparatus identifies the assailant 64 via images from the camera system 22, traffic cameras, etc. and feeds those images into the machine learning model which determines the type of vehicles present (e.g., high-end luxury cars, sedans, coupe, minivan, etc.). The apparatus then takes this data along with relevant other information such as the behavior/movement of the assailant 64 and feeds it back to the machine learning model (or to another model) to determine if the risk of a carjacking is low, medium, high, etc. based on the presence or lack of carjacking indicator(s).

It should be noted that the sedan 60 and the other passenger car 68 in this example represent any vehicle. Such vehicles may be standard gasoline powered vehicles, hybrid vehicles, an electric vehicle, a fuel cell vehicle, and/or any other mobility implement type of vehicle (e.g., bikes, scooters, etc.). The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

In some embodiments, the apparatus 10 may also observe and consider the value or desirability of the various vehicles on a given roadway. For example, high-end luxury cars may be a common target of carjackers (as seen in historical data). The apparatus 10 may detect such trends and use this information when determining the risk that a carjacking might occur for a given vehicle. Other less obvious information such as color, make, model, vehicle size or class, presence of window treatments, etc. which may make a certain vehicle more attractive to carjackers may also be detected from historical data records and/or aggregated data trends identified by the machine learning model(s) of the apparatus 10.

In one embodiment, a graphical user interface (GUI) may be integrated in the vehicle, which may include assisted driving vehicles such as autonomous vehicles, highly assisted driving (HAD), and advanced driving assistance systems (ADAS). Any of these assisted driving systems may be incorporated into the GUI. Alternatively, an assisted driving device may be included in the vehicle. The assisted driving device may include memory, a processor, and systems to communicate with the GUI. In one embodiment, the vehicle may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In this example, there is a restaurant (i.e., a POI) 68 adjacent to the roadway 50. This may be useful information for the apparatus as, in this example, the armed assailant 64 is holding a softball bat. Since the assailant is armed and not near a softball field or other POI which might explain away the presence of the softball bat, the apparatus will note the enhanced risk. The apparatus 10 then uses all the information/indicators (e.g., armed person presence, any driving movements/behaviors/position of the other car 68, restaurant presence) via the one or more machine learning models to determine if the armed assailant 64 is likely to attempt a carjacking. In this example, it is determined by the apparatus 10 that the armed assailant 64 is likely to attempt a carjacking. Based off this information, the apparatus may provide to the driver of the sedan 60 an alert (e.g., a high-risk alert) along with route guidance 62 to avoid the assailant 64. The route guidance 62 provided by the apparatus 10 is shown as an arrow which represents a suggested way to avoid the person (e.g., drive around it in the other lane). This data could also be used by the apparatus to provide an alert or route guidance to another user (e.g., the other passenger car 68) in the area. Since the assailant 64 poses a high risk, the suggest route change mitigates the risk while in some other examples, automatic braking, etc. may be applied by the apparatus to avoid even higher risk situations.

Route guidance may include various guidance options, visual and/or audio. For example, visual guidance on how and when to change lanes or audio guidance relaying the same information. Automatic driver controls like those for an autonomous vehicle (e.g., an automatic lane change that can include an explanation to the passenger on what is happening), etc. The guidance itself can include the alert messages as mentioned above so the generation of alerts and route guidance can be the same function. When calculating the route and route guidance, metadata such as a data flag or attribute of road segments are taken into consideration when forming different suggested routes and one or more segments are excluded from these routes when it is determined (by the apparatus) that one or more carjacking indicators is associated with the omitted segment(s).

In this example, the restaurant POI adjacent to the given roadway signifies any POI within reasonable proximity to the sedan 60 such that the POI could impact the behavior of proximate animate objects. There are many factors which can be considered by the apparatus to determine if a given POI is within reasonable range to be considered. Such data points were discussed above and can include but are not limited to map geometry data, historic data, and/or various other types of data. The proximity to the POI and/or map objects may be set at a certain threshold (e.g., within 100 feet, 1 mile, etc.) and the apparatus may examine multiple relevant POIs, map objects, etc. within this distance threshold relative to vehicles. For example, if multiple restaurants and bars are ahead of along a given roadway in the next half mile, the apparatus may determine the presence of multiple POIs may reduce or increase the likelihood of people around a given roadway which in-turn might increase or decrease the risk a carjacking may occur.

It should be noted that the examples above are non-limiting and the apparatus, user interface, etc. may be use numerous types of data in various contexts. For example, if a person is riding an ATV offroad in the woods, they may utilize the apparatus 10 on their end user device (e.g., smartphone or tablet). The apparatus 10 may still capture image data of the ATV and its surroundings to determine if any risk of vehicle robbery exists. As mentioned above, the apparatus 10 may look at many different data points to determine if such a risk is present. One such data point could be the behavior of animate objects relative to the vehicle. If the ATV drives past a person on a trail and they move away from the ATV the risk of carjacking is lower while if the person charges towards the ATV the risk is higher. In embodiments such as this the apparatus may operate in locations (without the need for more traditional vehicles) via trail cameras, end user smart phones, security cameras, etc.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for providing a carjacking prediction system comprising:
   obtaining image data of at least one vehicle and vehicle surroundings;
   determining a carjacking indicator based on the obtained image data;
   identifying one or more road segments;
   associating the determined carjacking indicator with the one or more identified road segments to update a map layer of a geographic database;
   receiving an indication of a location of the vehicle and identifying one or more points of interest proximate the location of the vehicle; and
   identifying at least one additional carjacking indicator for road segments similarly situated to a previously identified road segment associated with a previously determined carjacking indicator.

2. The method according to claim 1, further comprising determining a level of risk associated with a determined carjacking indicator and one or more points of interest and updating a map layer with the level of risk.

3. The method according to claim 1, further comprising providing an alert in response to a determined carjacking indicator to at least one end user device.

4. The method according to claim 1, further comprising obtaining the image data of the vehicle and vehicle surroundings from a vehicle camera system.

5. The method according to claim 1, further comprising providing route guidance in response to a determined carjacking indicator.

6. An apparatus configured to predict a carjacking, the apparatus comprising at least one processor and at least one memory storing computer program code, the at least one memory and the computer program code configured to, with the processor, cause the apparatus to at least:
   obtain image data of at least one vehicle and vehicle surroundings;
   determine a carjacking indicator based on the obtained image data;
   identify one or more road segments;
   associate the determined carjacking indicator with the one or more identified road segments to update a map layer of a geographic database; and
   identify at least one additional carjacking indicator based on road segments similarly situated to a previously identified road segment associated with a previously determined carjacking indicator.

7. The apparatus according to claim 6, wherein the at least one memory and the computer program code are further configured to, with the processor, cause the apparatus to receive an indication of a location of the vehicle, and wherein the at least one memory and the computer program code are configured to, with the processor, cause the apparatus to identify one or more points of interest proximate the location of the vehicle.

8. The apparatus according to claim 7, further comprising determining a level of risk associated with a determined carjacking indicator and one or more points of interest and updating a map layer with the level of risk.

9. The apparatus according to claim 6, wherein the at least one memory and the computer program code are further configured to, with the processor, cause the apparatus to receive an indication of a location of the vehicle, and wherein the at least one memory and the computer program code are configured to, with the processor, cause the apparatus to identify one or more map objects proximate the location of the vehicle.

10. The apparatus according to claim 6, wherein the at least one memory and the computer program code are configured to, with the processor, cause the apparatus to obtain the image data via a vehicle camera system.

11. The apparatus according to claim 6, wherein the at least one memory and the computer program code are configured to, with the processor, cause the apparatus to generate route guidance.

* * * * *